J. W. DEARING.
VALVE.
APPLICATION FILED JULY 31, 1916.
1,264,282.
Patented Apr. 30, 1918.
2 SHEETS—SHEET 2.
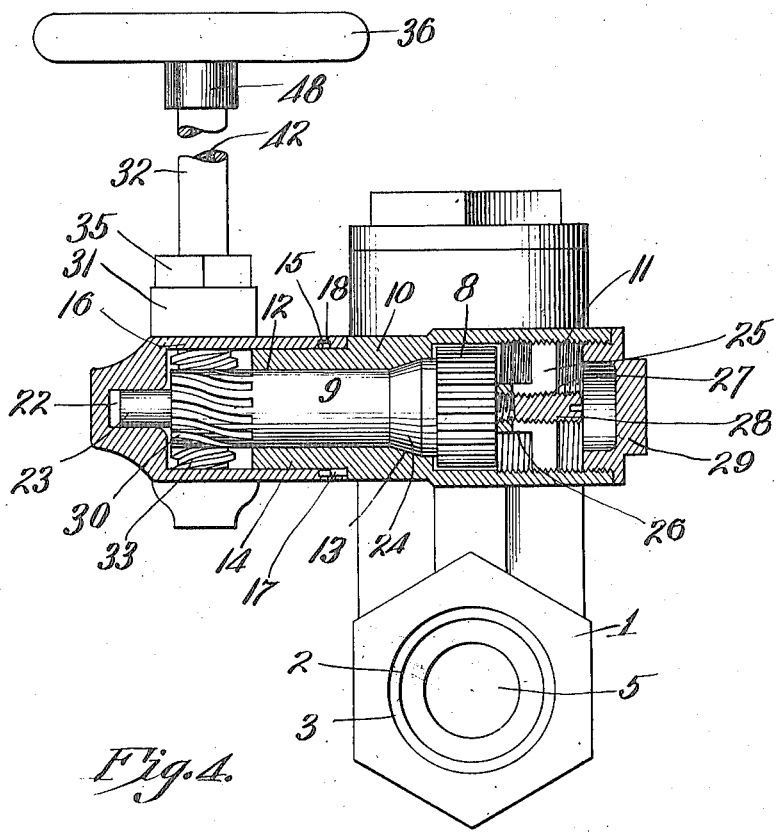
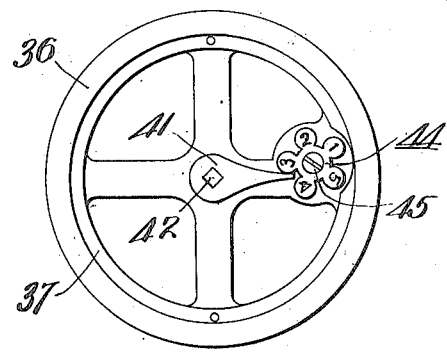
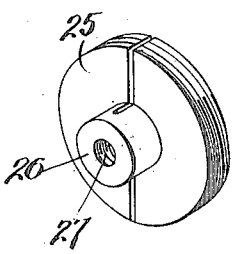
WITNESSES:
INVENTOR
J. W. Dearing
BY
ATTORNEY

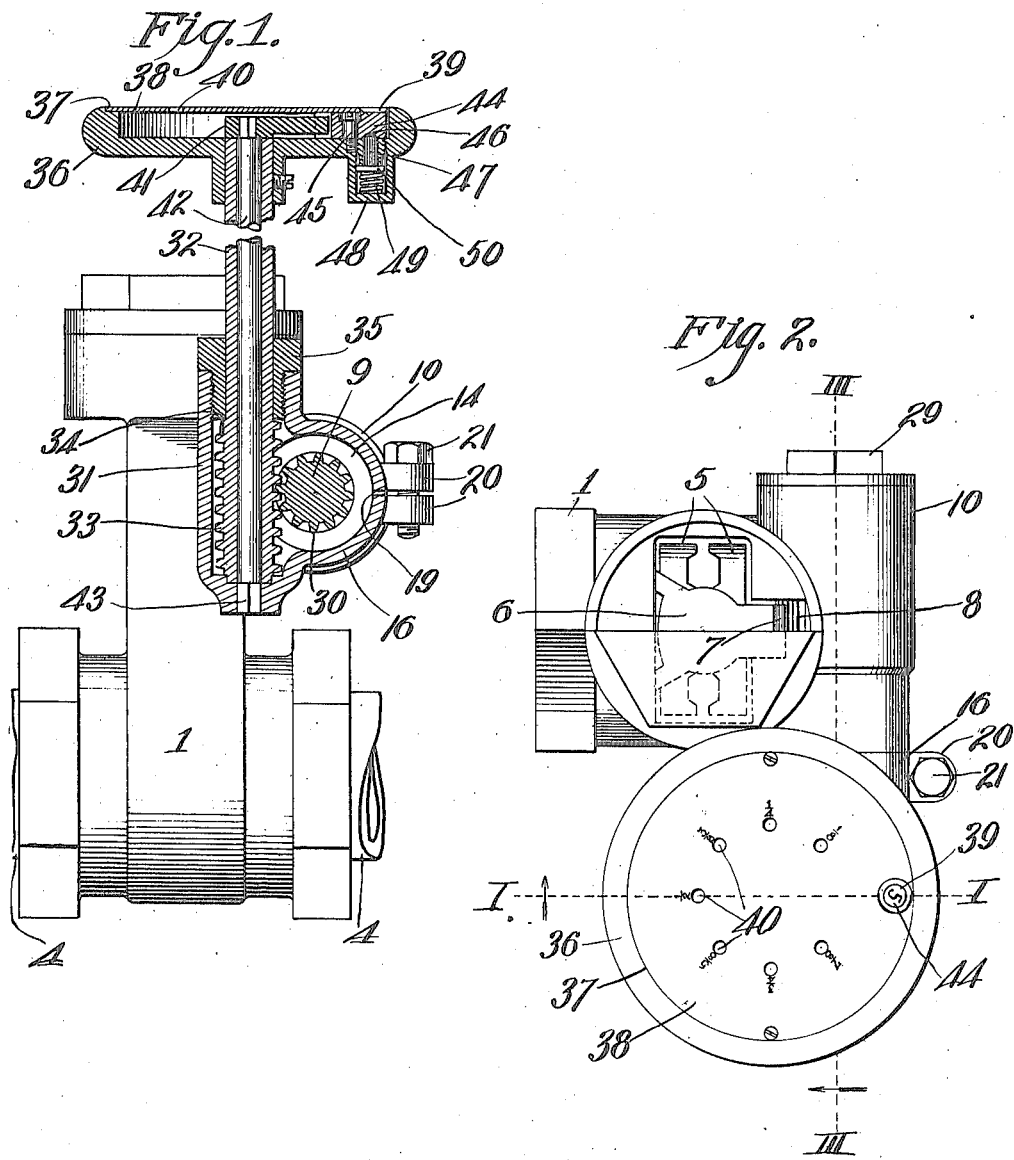

UNITED STATES PATENT OFFICE.

JOSEPH W. DEARING, OF KANSAS CITY, MISSOURI, ASSIGNOR TO PACKLESS VALVE CO., OF KANSAS CITY, MISSOURI, A CORPORATION OF DELAWARE.

VALVE.

1,264,282.    Specification of Letters Patent.    Patented Apr. 30, 1918.

Application filed July 31, 1916. Serial No. 112,255.

*To all whom it may concern:*

Be it known that I, JOSEPH W. DEARING, a citizen of the United States, residing at Kansas City, in the county of Jackson and State of Missouri, have invented certain new and useful Improvements in Valves, of which the following is a specification.

This invention relates to valves, and my object is to produce a valve having a handle which can be turned axially or operated as a lever to effect the opening or closing of the valve proper. Another object is to provide a valve having means for securing its handle at different points of radial adjustment that the same may be conveniently accessible at any point at which the valve may be located in a building.

A further object is to produce a valve having an actuating shaft, and simple and efficient means for establishing a fluid tight joint between said shaft and its bearing without the use of springs or packing. Another object is to produce a valve mechanism for indicating the extent of opening movement imparted to the valve proper.

Another object is to produce an efficient valve which embodies the desirable features of simplicity, strength and durability of construction.

With the objects named in view, the invention consists in certain novel and peculiar features of construction and combinations of parts as hereinafter described and claimed; and in order that it may be fully understood reference is to be had to the accompanying drawings, in which:—

Figure 1, is a vertical section taken on the line I—I of Fig. 2, of a valve embodying my invention.

Fig. 2, is a top plan view with the cap of the valve body cut away to expose parts otherwise hidden.

Fig. 3, is a vertical section taken on the line III—III of Fig. 2.

Fig. 4, is a top plan view of the hand wheel with the indicator plate omitted.

Fig. 5, is a detail perspective of an expansible nut forming a part of the valve.

In the said drawings, 1 indicates the body of the valve casing, the same being of inverted-T form and having offset perforated valve seats 2 establishing communication with the threaded passages or sockets 3, for the reception of the ends of service pipes 4. The stem of the casing is hollow, and fitting therein is a reciprocatory valve plug 5 of any conventional or well known type, the stem 6 of the valve being of Y-shape in plan view and constituting a rack bar through the provision of teeth 7 along one edge, which teeth are enmeshed with a cog wheel 8 formed on one end of a shaft 9 journaled in the offsetting sleeve 10 of, and communicating with, the stem of the valve casing, the cog wheel and teeth intermeshing at the point of communication between said sleeve and casing stem. The bore of the sleeve is threaded at one side of said point of communication as at 11, and at the opposite side thereof, is diametrically reduced as at 12, the reduced portion of the bore being flared at its end adjacent to the said point of communication to provide a tapered valve seat 13. The sleeve is externally reduced in diameter at its outer end and the reduced portion 14, is provided with an outwardly projecting lug 15.

A sleeve extension 16 fits telescopically on the reduced portion 14 and is provided with a short longitudinal slot 17 for the reception of the lug 15, and an internal circular channel 18 at the inner end of said slot is adapted to receive the said lug when the sleeve extension is rotated upon the latter for adjusting the valve. The end of the sleeve extension which fits over the reduced portion 14 is provided with a longitudinal slot or kerf 19 and with outwardly projecting lugs 20 at opposite sides of the kerf or slit engaged by a cap screw 21 which when screwed home draws the lugs together and thus clamps the sleeve extension rigidly upon the said reduced portion of the sleeve. The outer end of the sleeve extension is closed and formed with a socket 22, for the reception of and constituting a journal bearing for the diametrically reduced end 23 of the shaft 9, it being noted that the end of the said reduced portion of the shaft is spaced from the base or bottom of the socket so that the end thrust of the shaft is imposed wholly through the engagement of its conical or tapered portion 24, on the tapered bearing or seat 13. In the event of wear, the joint between the tapered portion 24 and the seat 13, can be kept fluid tight, by imparting endwise movement on the shaft, this being effected by means of the adjustment of the split nut 25 engaging the internal threads 11 of the sleeve. This split nut is provided with a hub 26 which bears against the adjacent end of the shaft, and to secure the nut against accidental movement, it is provided with a tapered threaded bore 27, engaged by a tapered threaded plug or bolt 28, the screwing home of said tapered bolt expanding the nut and clamping it firmly against the wall of the sleeve, and to guard against leakage, a closing cap 29 is employed, the same engaging the threads 11 of the sleeve and thus establishing a fluid tight joint therewith. At the opposite end of the shaft from the cog wheel and inward of the reduced extension 23 are spiral teeth constituting a worm wheel 30.

The sleeve extension 16 is provided with an intercommunicating tubular offset portion 31, closed at one end, and extending into and axially of said offset portion is a tubular shaft 32 provided with a worm 33 enmeshed with the worm wheel 30. The shaft bears at its lower end on the base or bottom of the closed end of said offset portion and is provided at the upper end of the worm with a shoulder 34, and engaging said shoulder and screwed into the upper end of said offset tubular portion around said shaft, is a nut 35, this nut thus guarding against longitudinal movement of the worm shaft. Secured rigidly upon the upper or outer end of the tubular shaft is a hand wheel 36, which when turned in one direction or the other transmits power to the shaft 9 and thus effects opening or closing movement of the valve plug 5.

Movement can be imparted to the valve plug if desired by applying pressure on the hand wheel to rotate the sleeve extension 16 of the sleeve 10, provided the cap screw 21, is unscrewed sufficiently to permit said extension to rotate. In thus operating the handle, the worm and worm wheel are interlocked and the former applies pressure laterally upon the latter and thus turns shaft 9, and operates the valve plug, as will be readily understood, it being understood in this connection that the engagement of the lug 15 with the internal channel 18, of the sleeve extension prevents the latter from slipping off the reduced end 14 of the sleeve 10.

In the event that the valve is located in a corner or at such point that the handle cannot be employed when the tubular shaft is vertical, the cap screw can be loosened to permit the handle to be swung to a radial position where the hand wheel is conveniently accessible; the cap screw can then be screwed home so that the rotation of the hand wheel will impart movement to the valve plug.

The hand wheel is formed with a circular recess 37 in its upper side and secured therein is a plate 38, provided with a sight opening 39 near its periphery and with a circular series of indicator perforations 40, through which may be observed a finger 41, secured rigidly on the upper end of a rod 42 extending through the tubular shaft, and secured rigidly at its lower end to the base or bottom of the tubular offset of the sleeve extension, as at 43. As the hand wheel is turned the perforations of the circular series successively expose the underlying indicator finger and by reference to markings adjacent the respective perforations 40, the operator can tell what proportion of the passage of the valve casing is exposed to the flow of the liquid from one of the pipes 4 to the other, that is to say if the finger 41 is visible through the perforation 40 associated with the marking 1/8, the operator will know that one-eighth of the cross sectional area of the valve casing passage is uncovered, and given the head pressure of the liquid or gas, its rate of flow and the volume which has passed through the valve can be readily determined.

The finger once in each revolution of the hand wheel, acts as a pawl to rotate a peripherally toothed wheel 44, journaled on a pin or stub shaft 45 screwed into one of the spokes of the hand wheel. The lower face of said wheel 44 has equidistant sockets 46 (one shown), for successive engagement with a catch 47 mounted in the said spoke and in a hollow boss 48 depending therefrom, and held pressed upward by a spring 49 arranged in the hollow boss and applying upward pressure on the collar or shoulder 50 of said catch, the collar or shoulder limiting upward movement of the catch by engagement with the plug 51, screwed in and forming a part of a spoke of the hand wheel. The plug is removable to permit the catch to be placed in or removed from position.

The teeth of the wheel 44 are numbered 1, 2, 3, etc., so that said numbers shall successively appear through the sight opening 39 in plate 38 and thus indicate how many turns the hand wheel has made, this being ascertained by noting the number on the toothed wheel which appears through the sight opening, and the position of the finger with reference to the fractional-turn markings on the plate. It will be understood of course that the parts may be so proportioned that the number of teeth on the wheel may be increased so that the said toothed wheel may register a correspondingly increased number of rotations of the hand wheel.

If desired the plate can be marked mathematically (not shown), with reference to a given head pressure so that the rate of flow can be ascertained by noting the distance the valve is opened. If the valve is used with fluid at a different head pressure, an appropriately marked plate must be employed.

It will be apparent that the valve plug can be opened or closed by turning the hand wheel around its own axis, and that the same result can be accomplished after loosening the cap screw 21, by applying pressure on the hand wheel to rotate the sleeve extension 16 on sleeve 10, which action through interlocked relation of the worm with the worm wheel, rotates shaft 9. In both cases the rotation of the shaft 9 transmits power through the cog and rack gearing to the valve plug.

If the valve is located overhead, the sleeve extension can be adjusted to dispose the hand wheel downward, or it can be disposed at any other radial position where it is conveniently accessible.

The engagement of the tapered portion 24 of the shaft on seat 13 provides a fluid tight joint without packing so that the valve may be employed for controlling the passage of fluids which would effect quick deterioration of the packing. It can also be used in places where subject to temperatures which would quickly impair the efficiency of a packing. In such situations the parts would have to be of such material that expansion and contraction could occur without producing leakage, that is to say that the parts should be made of metal having equal expansive and contractive capacity. At suitable intervals the cap 29 can be removed and the tapered plug 28 withdrawn sufficiently to permit the split nut to be advanced and thus insure the renewing of the fluid tight relation between the tapered portion of the shaft and the seat 13, there being sufficient looseness between the worm wheel and the worm to permit of such slight endwise adjustment of shaft 9 without necessitating rotative adjustment of the worm.

From the foregoing it will be apparent that I have produced a valve susceptible of use in various connections and with fluids of different kinds and different temperatures, and while I have illustrated and described the preferred embodiment of the invention, it will be understood that it is susceptible of modification without departing from the principle of construction involved.

I claim:—

1. In a valve, the combination of a casing having a fluid passage, a movable plug for controlling said passage, a rotatable handle, means for transmitting power from the handle to the plug to open and close the valve, said handle having a sight-opening, a rigid toothed wheel journaled on the handle and provided with characters on the upper sides of the teeth for successive exposure through said sight-opening, and means for imparting one rotatable step to said toothed wheel for each complete rotation of the handle.

2. In a valve, the combination of a casing having a fluid passage, a movable plug for controlling said passage, a rotatable handle, means for transmitting power from the handle to the plug to open and close the valve, said handle having a sight-opening, a rigid toothed wheel journaled on the handle and provided with characters on the upper sides of the teeth for successive exposure through said sight-opening, a spring-actuated catch for yieldingly holding the toothed wheel against accidental rotation and with any of its characters visible through said sight-opening, and a fixed pawl for imparting one rotatable step to the toothed wheel for each rotation of the handle.

3. A valve comprising a casing having a fluid passage, a movable plug for controlling said passage, an offsetting sleeve, a fluid tight closure for one end of said sleeve, a sleeve extension mounted on the other end of said sleeve and closed at its outer end, a shaft journaled in said sleeve and said sleeve extension and geared to the valve plug to open and close the same, a tubular offsetting portion for the sleeve extension, a rotatable handle mounted in said offset of said sleeve extension, a gear connection between said handle and said shaft whereby rotation of the former around its own axis or as a lever around the axis of said shaft shall impart rotation of the latter and opening or closing movement to the valve plug, and means to secure the sleeve extension rigidly on said sleeve at any desired point of rotatable adjustment on said extension and thereby prevent the use of said handle as a lever to effect operation of the valve plug.

4. In a valve, the combination of a casing having a fluid passage and a communicating offsetting sleeve provided with internal threads and a tapered seat at opposite sides of the point of communication of the sleeve with the casing, and of reduced internal diameter at the opposite side of the said tapered seat from said internal threads, a shaft journaled in the reduced portion of the sleeve and provided with an enlarged tapered portion engaging said seat, a valve plug within the casing, means whereby rotation of said shaft shall transmit movement to said valve plug, an expansible nut engaging the threads of said sleeve, and the adjacent end of said shaft to hold the tapered portion of the same against said tapered seat, and a wedge plug screwed into said nut to expand and thereby clamp the same tightly in said sleeve.

5. In a valve, the combination of a casing having a fluid passage and a plug for controlling said passage and also having a communicating offsetting sleeve provided with internal threads and a tapered seat at opposite sides of the point of communication of the sleeve with the casing, a shaft journaled in the sleeve and connected at said point of communication to transmit opening and closing movement to the valve plug and provided with a tapered portion engaging said tapered seat with a fluid-tight relation, an expansible nut engaging the threads of the sleeve and the adjacent end of the shaft to hold the tapered portion of the same against the tapered seat, a wedge plug engaging said nut to expand and clamp the same tightly in the sleeve, a cap closing the sleeve at the opposite side of said nut from said shaft, and means for imparting rotatable movement to said shaft.

In testimony whereof, I affix my signature, in the presence of two witnesses.

JOSEPH W. DEARING.

Witnesses:
J. C. O'CONNOR,
E. MOORE.